United States Patent [19]

Bauer et al.

[11] Patent Number: 4,767,224

[45] Date of Patent: Aug. 30, 1988

[54] WINDOW CAGE, PARTICULARLY FOR CYLINDRICAL ROLLER BEARINGS

[75] Inventors: Anton Bauer, Euerbach; Siegbert Hahn, Geldersheim, both of Fed. Rep. of Germany

[73] Assignee: FAG Kugelfischer Georg Schafer (KGaA), Fed. Rep. of Germany

[21] Appl. No.: 69,410

[22] Filed: Jul. 1, 1987

[30] Foreign Application Priority Data

Jul. 23, 1986 [DE] Fed. Rep. of Germany ....... 3624850

[51] Int. Cl.$^4$ .............................................. F16C 33/46
[52] U.S. Cl. ................................................. 384/572
[58] Field of Search ............... 384/572, 575, 577, 576, 384/578, 579

[56] References Cited

U.S. PATENT DOCUMENTS

| | | | |
|---|---|---|---|
| 2,848,791 | 8/1958 | Neese | 384/572 |
| 3,438,685 | 4/1969 | Teufel | 384/575 |
| 3,482,891 | 12/1969 | Evangelista et al. | 384/575 |
| 3,993,176 | 11/1976 | Marola et al. | 384/577 |

Primary Examiner—Lenard A. Footland
Attorney, Agent, or Firm—Ostrolenk, Faber, Gerb & Soffen

[57] ABSTRACT

A window cage for a cylindrical roller bearing includes a U-shaped cross section, annular cage having opposite cage rings which engage the ends of the rollers and webs joining the cage rings and extending between the rollers. The opposite sides of each web converge in the radial direction inwardly of the pocket recesses for the rollers. Therefore, spaced apart, opposing sides of two adjacent webs converge in the radial direction outwardly of the pocket recesses to engage a roller in the recess from behind. Radially outward beyond the converging surfaces, the web sides have generally parallel surfaces which are spaced apart slightly less than the diameter of the roller. Recesses are defined in the cage rings at the bottoms of the pocket recesses.

14 Claims, 2 Drawing Sheets

WINDOW CAGE, PARTICULARLY FOR CYLINDRICAL ROLLER BEARINGS

BACKGROUND OF THE INVENTION

The present invention relates to a window cage particularly for cylindrical roller bearings.

A window cage of this type is seen in Federal Republic of Germany Pat. No. 908 436. Such a cage is manufactured from an annular member which is U-shaped in partial cross section. Axially extending recesses are provided in the radial bottom region of the member, whereby pockets for the rollers are produced in a simple manner. The webs which join the side rings of the cage have a trapezoidal cross section. Since their pocket surfaces are normally parallel to each other, the rollers can be easily introduced into the cage, but a structural unit of cage and rollers does not result. That German patent says that the rollers are to be held fast by suitable means. But, no such means is indicated.

Even if the pocket surfaces converge toward the axis of the cage, as is indicated elsewhere, pocket surfaces which are so inclined that the rollers are prevented from falling out are obtained only with certain cages. Difficulties also arise in snapping the rollers into place in the cage. If the cage is dimensioned so that the rollers are extensively gripped from behind, then the rollers cannot be introduced with spring action from the radial side at which they are gripped from behind. If the extent of the rear gripping is reduced, then introduction of the rollers with spring action is possible. But there is a danger that the rollers will drop out of the cage again. Furthermore, there are sharp edges of the cage at the snap in places, and these edges may damage the rollers upon their being snapped into place.

SUMMARY OF THE INVENTION

The invention concerns a window cage for a roller bearing, and particularly a cylindrical roller bearing. The bearing has an outer ring, an inner ring within the outer ring and a complement of rollers, particularly cylindrical rollers, between the rings. A cage between the rings separates the rollers.

The cage is annular, and is generally U-shaped in cross section. It comprises axially opposite cage rings which engage the opposite axial ends of the rollers. It further comprises webs which join the cage rings, and there is a respective web between each pair of adjacent rollers.

Each web is of uniform cross section along and extends parallel to the axis of the bearing. Each web has its own opposite circumferential sides. The spaced apart opposing sides of two adjacent webs between them define a pocket recess for a roller. The cage rings are cut out between the webs so that the pocket recesses for the rollers also continue axially through the cage rings. The opposite sides of the webs extend out of the respective pocket recesses. In the direction into the pocket recesses, the opposite sides of each web converge toward the radial side of the cage that is opposite the side in which the pocket recesses are formed. This means that the spaced apart opposing sides of adjacent webs also define a pair of opposed converging surfaces that converge toward each other in the radial direction out of the pocket recesses and which therefore converge behind and support rollers in the pocket recesses. The opposed converging sides of two adjacent webs may be inclined at an angle of about 5° to 12° to a radial plane passing through the axis of a roller that is supported in the pocket recess between the webs. As a result, a roller may be supported against at least one of the converging surfaces defining its pocket recess to prevent the roller from falling out of the respective pocket recess. The angle of convergence and the spacing of the webs causes the converging surfaces to engage the rollers from behind and on the side of the roller beyond its axis outward of the pocket recess.

At that end of the web which is furthest out of the pocket recess, and radially beyond the respective converging side surface of that web, the opposing sides of adjacent webs include generally parallel surfaces, although each of those generally parallel surfaces may be slightly rounded. The opposed, generally parallel surfaces are spaced a distance apart which is slightly smaller than the largest diameter of the rollers, and may be about 99% of the diameter. The base of each pocket recess at each web side defining that recess at each side ring is defined as a respective rounded depression.

In one embodiment, the pocket recess is open toward and the sides thereof converge in the radial direction inwardly of the bearing. In another embodiment, those sides open toward and converge radially outwardly of the bearing.

The converging pocket surfaces, followed by parallel pocket surfaces on the web opposite sides produce a structural unit when their cut edges are at a distance apart which is slightly smaller than the diameter of the rollers. Although cage edges still result, as a result of the parallel surface sections, sharp edges are avoided. Convexly rounded surfaces would be even better since here, upon the snapping of the rollers into position, contact between them and sharp edges is avoided. Furthermore, with the invention, particularly in the case of manufacture of the cage recesses and web surfaces by grinding, a relatively precise clearance of the rollers in the pockets is maintained. As a result, roller protrusion, which for purposes of the assembly of the bearing must not be large, can be maintained precisely.

The resting of the rollers against the pocket surfaces is most favorable when those opposing surfaces on adjacent webs are inclined at an angle of about 5° to 12° to the radial plane passing through the axis of the corresponding roller.

For a dependable holding of the rollers in the pockets, it is sufficient for the parallel surfaces of the pockets to be at a distance apart which is slightly less than, e.g. equal to about 99% of, the diameter of the roller.

In accordance with a further embodiment of the invention, if the converging surfaces are produced by grinding, it is then advisable to develop the pocket sections such that two rounded depressions are produced in each of the side rings. These depressions then pass into the converging surfaces. For this, one can use rounded grinding wheels, the pocket contours being then obtained in a functionally favorable manner. Furthermore, edges with their unfavorable notch effect are avoided so that the danger of breakage of the cage is reduced.

Other objects and features of the invention are explained below with reference to the drawings.

DESCRIPTION OF THE PREFERRED EMBODIMENTS

Figure 1:
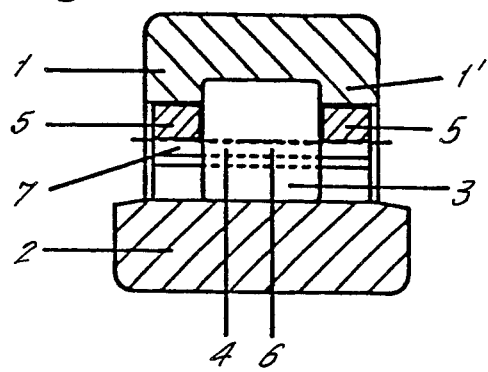
FIG. 1 is a partial cross section through a cylindrical roller bearing having a cage in accordance with the invention.
Figure 2:
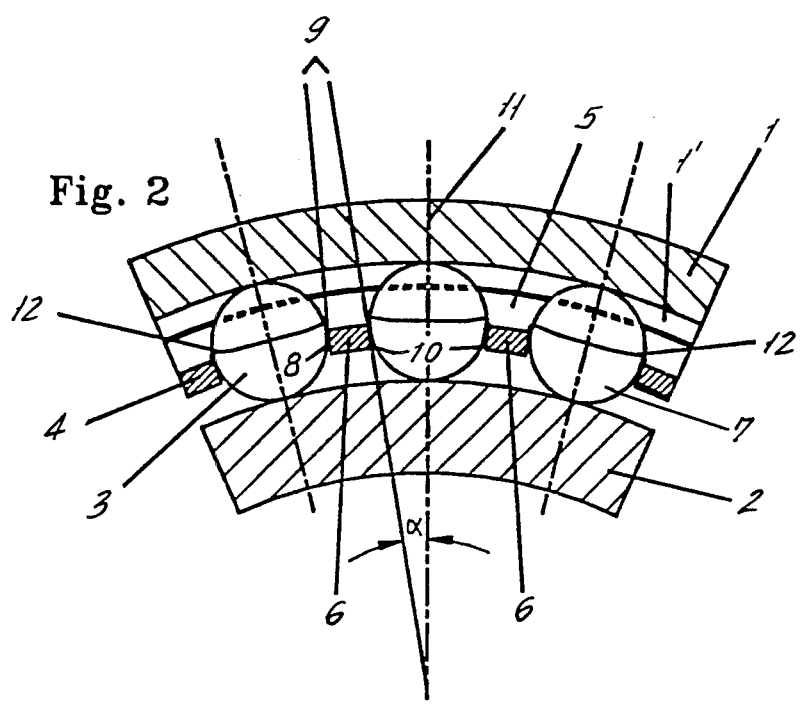
FIG. 2 is a partial cross axial section through a cylindrical roller bearing according to FIG. 1.

A cylindrical roller bearing shown in FIGS. 1 and 2 comprises an outer ring 1, an inner ring 2 inside the outer ring and the cylindrical rollers 3 which travel over the raceways of the rings and are held spaced apart from each other by the window cage 4.

Figure 3:
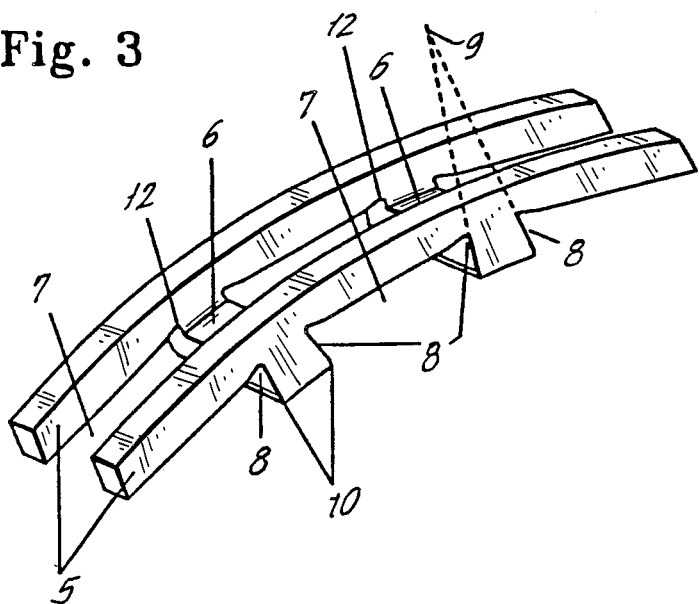
FIG. 3 is a perspective view of part of the bearing cage shown in FIGS. 1 and 2.

Referring to FIG. 3, the cage 4 is of a generally U-shaped cross-section and comprises the side rings 5, the webs 6 which join the side rings and the recesses which form the pockets 7 for the rollers 3, which recesses continue axially through the side rings 5. The webs 6 are of uniform cross section along and extend parallel to the axis of the bearing. Each web extends between two adjacent rollers. The opposite circumferential sides of each web are roller engaging pocket surfaces 8.

In order to keep the rollers in the cage to define a structural unit and avoid the danger of roller damage, the pocket surfaces 8 which face the rollers 3 have a special shape. In FIGS. 2 and 3, the surfaces 8 at the opposite sides of each web 6 converge in the radial direction into the pocket recesses, whereby they have an axial line of intersection 9 lying preferably radially outside the cage 4, in the case of the bearing with lips 1' on the outer ring, which is shown here. The line of intersection is on the opposite radial side of the cage from the open pocket recesses. The facing or opposing sides of two adjacent webs converge in the opposite radial direction, i.e. in the radial direction out of the pocket recesses, to support a roller in a pocket recess. The webs 6 grip behind the rollers 3, which in FIG. 3 is radially inward of the center axes of the rollers, to hold the installed rollers in the pocket recesses of the cage. In this way, linear contacts are obtained in desired manner between the rollers 3 and the surfaces 8, with favorable lubricating wedges forming at the contacts.

To avoid damage to the rollers 3 upon the snapping of the rollers 3 into place from the inside which, of course, can only be done when the inner rings 2 are removed, radially short height parallel surfaces 10 are formed on the opposite sides of each web, with the two surfaces on each web being approximately parallel to a radial plane 11 through the axis of the respective rollers 3. Each surface 10 is outward of the pocket recess and adjoins the respective converging surface 8 radially within the pitch circle and inward of the contact of the surfaces 8 and rollers 3. In this way, sharp edges are avoided at these places. The surfaces 10 might be ground to have a slight convex curvature, although overall they are generally parallel. This further assures that there are no edges which scrape the rollers.

Conditions are most favorable if the opposing converging surfaces 8 on two adjacent webs 6 are each inclined at an angle of 5° to 12° to the radial plane 11 which passes through the axis of the corresponding roller 3 between them and if the distance apart of opposed generally parallel surfaces 10 of adjacent webs 6 is about 99% of the diameter of the rollers 3. Despite the fact that there are multiple surfaces in the pockets, the pocket surfaces can be easily produced. Using grinding processes, the results are also very accurate, so that the bearings are suitable for very high speeds of rotation and can be used, for instance, in the power plants of airplanes.

For producing this cage, one proceeds from a basic profiled annular ring which is U-shaped in partial section. First, there are ground into the ring in the region of its radial bottom, a number of rectangular grooves which pass axially through the ring. The number of grooves equals the subsequent number of pockets. This is effected by axial guidance of the grinding wheel. After these grooves have been formed, only the side rings 5 of the cage remain as closed rings. In two successive steps, first one and then the other of the converging web surfaces 8 is produced by a narrow grinding wheel which is rounded at its edge, through axial guidance of the grinding wheel. The roundness of the grinding wheel results in the production of corresponding depressions 12 in the side rings 5 at the base of each web surface 8. Upon these grinding steps, small radially outward sections of the rectangular groove formed in the first grinding step still remain unmachined. These form the parallel surfaces 10 whose distance apart within a pocket 7 is slightly less than the largest diameter of the rollers 3.

Figure 4:
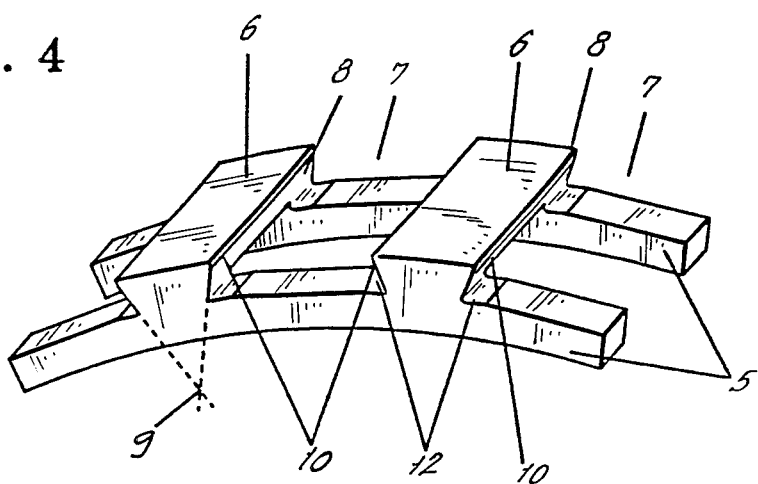
FIG. 4 shows a cage which is a variant of the cage of FIG. 3.

FIG. 4 shows a cage which is a variant from the cage of FIG. 3. This cage is intended for bearings in which the rollers are snapped into position radially from the outside rather than from the inside as in FIG. 3. The webs 6 are on the radial outside of the cage, rather than on the inside. The web surfaces converge in the opposite direction in FIG. 4 from those in FIG. 3. In FIG. 4, the opposite surfaces 8 of a web 6 converge toward an axial line 9 which is radially inward of the cage, rather than radially outward as in FIG. 3. The angles of incline of the surfaces 8 must be adjusted for the rollers being on the outwardly facing side of the cage. The grinding steps are performed in the same sequence and produce pockets with the same functional characteristics as in FIG. 3. The surfaces 8 engage the rollers radially outward of the roller axis so that the cage holds the rollers in their pocket recesses. Since otherwise the same conditions exist, the same reference numbers are used in FIG. 4 as were used in FIG. 3 for the same features.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A window cage for a roller bearing, the cage comprising:
    an annular cage member, which is generally U-shaped in cross section, the U-shape comprises axially opposite cage rings for engaging the opposite axial ends of the rollers of the bearing and comprises webs joining the cage rings, with a respective web being located to extend between adjacent bearing rollers;
    each web having opposite sides facing circumferentially outward, opposing sides of two adjacent webs defining a pocket recess for a respective roller; the sides of the webs extend out of the pocket recesses; the opposite sides of each web converge in the direction into the pocket recess, so that in the direction out of the pocket recesses, the spaced apart, opposing sides of adjacent webs define converging surfaces for supporting a roller against a convering surface to prevent the roller from falling out of the respective pocket recess therefor;

at the radial end of the web furthest out of the pocket recess and radially beyond the converging surfaces, the opposing sides of adjacent webs include generally parallel surfaces, and each parallel surface adjoins a respective converging surface, and the opposed generally parallel surfaces being spaced a distance apart which is slightly smaller than the largest diameter of the roller held in the respective pocket recess.

2. The cage of claim 1, wherein the rings are cut out between the webs so that the pocket recesses continue axially through the cage rings.

3. The cage of claim 2, wherein at the base of each pocket recess at each web side defining that recess at each side ring there is defined a respective rounded depression.

4. The cage of claim 1, wherein each web extending across the space between the rings is of uniform cross section and parallels the axis of the bearing.

5. The cage of claim 1, wherein the opposed converging surfaces of two adjacent webs are each inclined at an angle of about 5° to 12° to a radial plane passing through the axis of a roller supported in the pocket recess.

6. The cage of claim 4, wherein each two of the opposed, generally parallel surfaces are spaced apart a distance which is about 99% of the diameter of the roller supported in the pocket recess between the respective opposing sides.

7. The cage of claim 1, wherein each two of the opposed, generally parallel surfaces are spaced apart a distance which is about 99% of the diameter of the roller supported in the pocket recess between the respective opposing sides.

8. The cage of claim 1, wherein the generally parallel surfaces are slightly rounded.

9. The cage of claim 1, wherein the web sides are directed such that the pocket recesses open radially outwardly and the opposite sides of each web converge in the radial direction inwardly of the bearing.

10. The cage of claim 1, wherein the web sides are directed such that the pocket recesses open radially inwardly and the opposite sides of each web converge in the radial direction outwardly of the bearing.

11. A roller bearing comprising an outer ring, an inner ring inside and radially spaced inwardly from the outer ring, a set of rollers held for rolling between the outer and the inner rings, and the cage of claim 1 between the rings, wherein
each of the cage webs passes between two adjacent ones of the rollers, the rollers having opposite axial ends and the cage rings extending past the axial ends of the rollers; each roller being in a respective pocket recess and the roller being engageable by a respective one of the converging surfaces in the pocket recess at a location on the roller that is on the radial side of the axis of the roller that is radially outward of the pocket recess for preventing the roller from falling from the pocket recess.

12. The bearing of claim 11, wherein the rollers are cylindrical rollers.

13. The bearing of claim 12, wherein each web extending across the space between the rings is of uniform cross section and parallels the axis of the bearing.

14. The bearing of claim 12, wherein the opposed converging surfaces of two adjacent webs are each inclined at an angle of about 5° to 12° to a radial plane passing through the axis of a roller supported in the pocket recess; the generally parallel surfaces are spaced apart a distance which is about 99% of the diameter of the roller supported in the pocket recess between the respective opposing sides.

* * * * *